United States Patent [19]

Kanzawa et al.

[11] Patent Number: 5,022,456
[45] Date of Patent: Jun. 11, 1991

[54] BODY FRAME, AND PRODUCTION PROCESS AND APPARATUS THEREOF

[75] Inventors: Yoshikazu Kanzawa; Yasushi Fujikake; Osami Ito; Shuho Ito; Hironobu Oikawa; Makoto Otsubo; Iwao Morikawa; Yuichi Shiratori; Kiyoshi Tsukada, all of Sayama, Japan

[73] Assignee: Honda Giken Kogyo Kabushiki Kaisha, Tokyo, Japan

[21] Appl. No.: 497,890

[22] Filed: Mar. 23, 1990

[30] Foreign Application Priority Data

| Mar. 25, 1989 | [JP] | Japan | 1-72886 |
| Mar. 25, 1989 | [JP] | Japan | 1-72887 |
| Apr. 6, 1989 | [JP] | Japan | 1-88316 |

[51] Int. Cl.[5] .................. B22D 18/04; B22D 18/06
[52] U.S. Cl. .................. 164/119; 164/135; 164/306
[58] Field of Search .......... 164/63, 65, 137, 135, 164/337, 339, 340, 341, 342, 369, 30, 31, 32, 119, 306

[56] References Cited

U.S. PATENT DOCUMENTS

| 2,448,632 | 9/1948 | Smith | 164/254 |
| 4,727,922 | 3/1988 | Nakano | 164/255 |
| 4,824,351 | 4/1989 | Ramsey | 164/137 |

FOREIGN PATENT DOCUMENTS

| 0225040 | 6/1987 | European Pat. Off. . |
| 0225525 | 6/1987 | European Pat. Off. . |
| 0243773 | 11/1987 | European Pat. Off. . |
| 59-47044 | 3/1984 | Japan | 164/63 |
| 59-153566 | 9/1984 | Japan | 164/255 |
| 60-176876 | 9/1985 | Japan . |
| 61-180664 | 8/1986 | Japan | 164/137 |
| 62-9742 | 1/1987 | Japan | 164/340 |
| 62-31576 | 2/1987 | Japan . |
| 86/05458 | 9/1986 | PCT Int'l Appl. . |
| 87/06901 | 11/1987 | PCT Int'l Appl. . |
| 842522 | 7/1960 | United Kingdom . |
| 907410 | 10/1962 | United Kingdom . |
| 1180370 | 2/1970 | United Kingdom . |
| 1455626 | 11/1976 | United Kingdom . |
| 1562532 | 3/1980 | United Kingdom . |
| 2047140A | 11/1980 | United Kingdom . |
| 2065518A | 7/1981 | United Kingdom . |
| 2208817 | 4/1989 | United Kingdom . |

Primary Examiner—Kuang Y. Lin

[57] ABSTRACT

A body frame for a motor bicycle includes a main frame, a head tube provided at a front end of the main frame and down tubes extending rearward from the main frame. The main frame, head tube and down tubes are cast with a light alloy into an integral form of a hollow and thin-wall structure. A production process of the body frame, wherein an integrally-formed core, which is formed into a shape similar to that of the body frame, is hollow and has good permeability. A molten metal is charged into the mold and a vacuum is applied to the interior of the core. The molten metal is charged into a cavity defined between the core and the molding surface of the mold by a low-pressure casting method, and the molten metal is solidified so as to cast the body frame. A production apparatus of the body frame includes a liftable cope fitted to a vertical casting machine, a fixed drag, and slidable molds disposed in combination with the cope and being capable of horizontally sliding in a state that the cope is released from the drag. A body frame having both properties of light weight and high stiffness, and a production process and apparatus thereof is provided wherein casting defects and to provide a high-precision cast article, is provided.

6 Claims, 13 Drawing Sheets

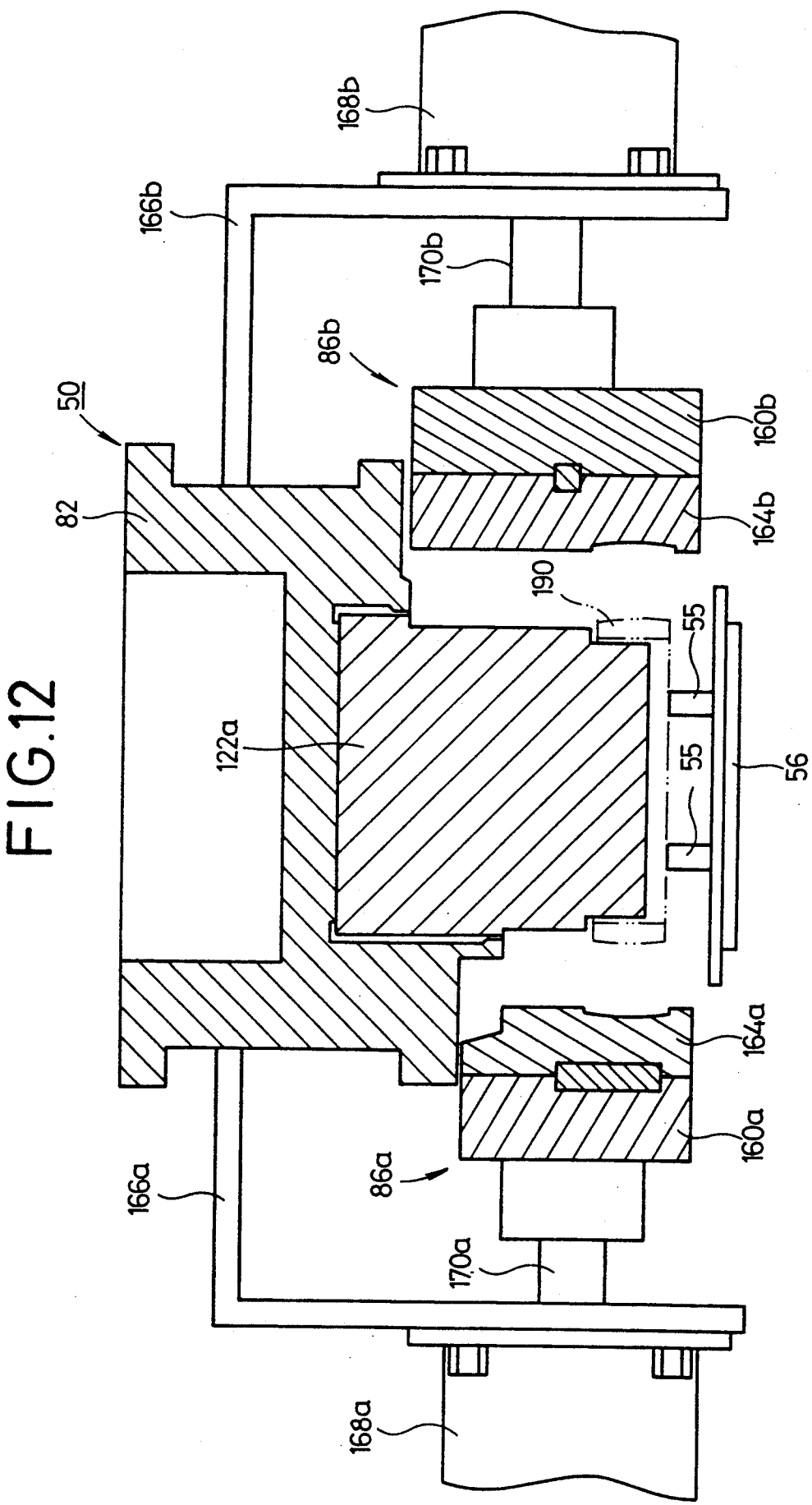

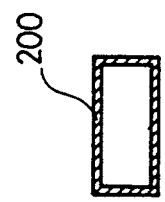
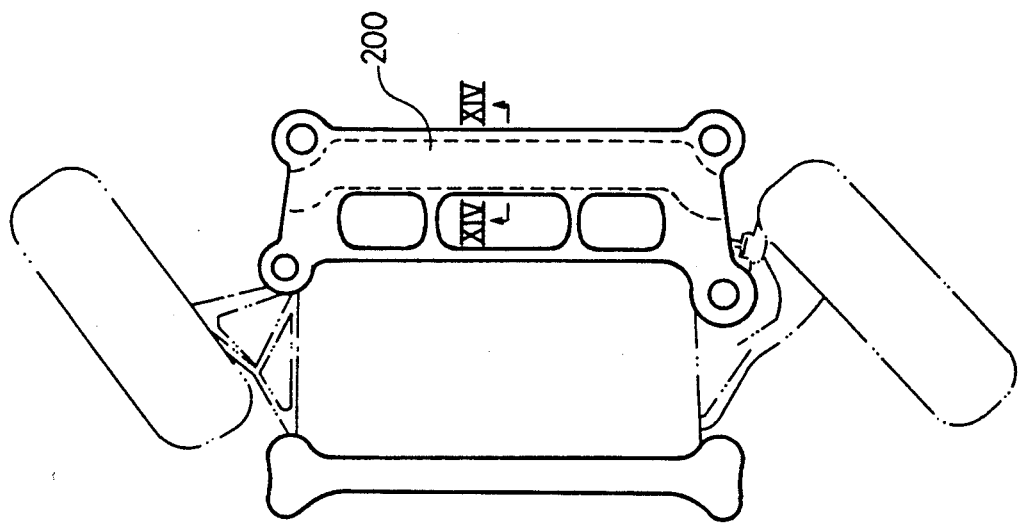

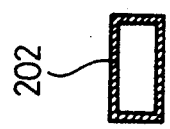
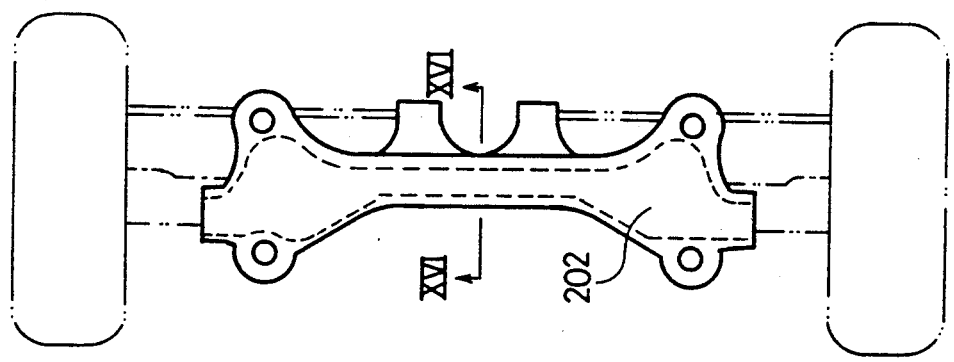

BODY FRAME, AND PRODUCTION PROCESS AND APPARATUS THEREOF

FIELD OF THE INVENTION

This invention relates to a hollow, thin-wall body frame, which has been molded into an integral structure by aluminum-diecasting, and a production process and apparatus thereof.

Motor bicycles of a sporting type have recently enjoyed popularity among young people and their performance has been considerably enhanced. There has correspondingly been a demand for the increase of stiffness and acceleration of weight reduction body frames. With the foregoing in view, body frames have more recently come to be produced by casting making use of an aluminum alloy or the like as a material.

It is indeed known to produce a body frame by casting separately a head tube, a main frame, down tubes, etc., which are the structural members, in accordance with a gravity casting or low-pressure casting method, and then welding and joining them to one another. However, such a production method is complicated in welding operation and requires a stress-relieving process because welding stress remains in the welded joints. Therefore, the method increases in the number of processes and is hence low in productivity. In addition, it is accompanied by a disadvantage that the strength of the body frame itself is dependent on its weld quality.

Accordingly, it has progressed to develop a production process of body frames, wherein the whole body frame is cast as an integral structure.

In the prior art as to this kind of body frame, the body frames disclosed in (1) Japanese Patent Application Laid-Open No. 176876/1985 and (2) Japanese Patent Application Laid-Open No. 31576/1987.

The body frame disclosed in Japanese Patent Application Laid-Open No. 176876/1985 is obtained by casting structural members such as a head tube, a main frame and down tubes into an integral form in such a way that the joints between the main frame and the down tubes are connected by bends each drawing a smooth curve.

This body frame is laid stress on the enhancement of stiffness. Although holes intended for weight reduction are defined therein, these holes are insufficient to accelerate the weight reduction because their profiles are in an I-shaped form.

On the other hand, the body frame disclosed in Japanese Patent Application Laid-Open No. 31576/1987 is the same as the body frame described above in that a head tube, a main frame and down tubes are integrally cast. In order to attain its weight reduction, it is however cast making use of a core so as to form a partial hollow structure as viewed from its section. Alternatively, it has a turned square U-shape, E-shape or C-shape in its section.

However, in the case where such a body frame is cast, there is a disadvantage that since a resin as a thickener is contained in the core used in defining a predetermined sectional configuration for the purpose of the weight reduction, a combustion gas generating from the resin when a molten metal has come into contact with the core is entrained in the molten metal, so that casting defects such as flowholes caused by such gas tend to occur. In addition, although it is possible to satisfy both requirements of the weight reduction and the enhancement of stiffness, which are essentially antipodal to each other, by increasing hollow parts, on the contrary, there is pointed out a defect that the run of the molten metal grows worse with respect to thin-wall portions to be cored.

Furthermore, when such a body frame is cast by means of a vertical casting machine, its mold correpsonds to the shape of the body frame and hence is long and thin in wall. With respect to a drag in paricular, since a furnace storing a molten metal is placed right under the drag, its own dimensional distortion tends to occur due to the influence of high temperature caused by the molten metal and the like. A fixed clearance is defined between the drag and a slidable mold so as to ensure the displacement of the slidable mold. When the clearance is warped, it is impossible to keep the complete clamping, so that flashes are formed on a resulting cast article and a cause of operation failure in the slidable mold is brought about.

Moreover, the core is incorporated in such a drag. When sand drops from the core upon fixing of the core, it cannot be remove because the core is in a fixed state. In particular, since divided cores, which are united into an integral form, are used in the casting of a body frame, the drop of the sand from the joints may occur by any means. In order to avoid such a matter, various means have been presented. However, no good solution has appeared.

Incidentally, problems of this sort also exist in production of body frames constituting four-wheel cars and the like in addition to those of motor bicycles.

SUMMARY OF THE INVENTION

It is a principal object of this invention to provide a body frame having both properties of light weight and high stiffness, and a production process and apparatus thereof, wherein it is possible to obviate casting defects and to provide a high-precision cast article.

Another object of this invention is to provide a body frame comprising:
 a main frame;
 a head tube provided at a front end of the main frame; and
 down tubes extending rearward from the main frame,
 said main frame, head tube and down tubes being cast with a light alloy into an integral form of a hollow and thin-wall structure.

A further object of this invention is to provide a production process of a body frame, comprising the steps of:
 charging a core, which is formed into a shape similar to that of the body frame, is hollow and has good permeability, into a mold;
 sucking from the interior of the core;
 charging a molten metal into a cavity defined between the core and the molding surface of the mold by a low-pressure casting method; and
 solidifying the molten metal so as to cast the body frame.

A still further object of this invention is to provide a production process of a body frame, which comprises sucking from the interior of a cavity to accelerate the run of a molten metal charged into the cavity.

A yet still further object of this invention is to provide a production process of a body frame, which comprises starting the suction from the interior of a cavity at the moment a molten metal is charged into the cavity.

A yet still further object of this invention is to provide a production process of a body frame, which comprises increasing the degree of vacuum within a cavity more than that in the interior of a core.

A yet still further object of this invention is to provide a production process of a body frame, which comprises using a core obtained by integrally uniting divided cores, which have been formed at every structural part of the body frame.

A yet still further object of this invention is to provide a production process of a body frame, comprising the steps of:
- supporting a core on a liftable mount at a position facing the molding surface of a cope;
- clamping slidable molds so as to fix the core relative to the cope;
- charging a molten metal into a cavity defined between the molding surfaces of the cope, a drag and the slidable molds and the core by a low-pressure casting method; and
- solidifying the molten metal so as to cast the body frame.

A yet still further object of this invention is to provide a production process of a body frame, comprising the steps of:
- arranging a mold in such a manner that a predetermined portion of a cavity, which corresponds to a head tube in the mold, is located at the lower part, a prescribed portion of the cavity, which corresponds to a rear frame, is located at the upper part, and the portion corresponding to down tubes is directed upward;
- pouring a molten metal into the mold through a sprue communicating with the predetermined cavity portion corresponding to the head tube by a low-pressure casting method in such manner that the molten metal is directed to the cavity portions corresponding to the rear frame and down tubes from the head tube portion; and
- solidifying the molten metal so as to form integrally a body frame for a motor bicycle, which comprises the head tube, main frame and down tubes and is hollow.

A yet still further object of this invention is to provide a production process of a body frame, wherein upon pouring a molten metal into cavity portions, which correspond respectively to a rear frame and down tubes and are located at the upper part, from the cavity portion corresponding to a head tube, which is located at the lower part, via respective runners and gates from a plurality of sprues, the teeming rate of the molten metal on the head tube sides is made greater than those of the rear frame and down tube sides.

A yet still further object of this invention is to provide a production apparatus of a body frame, which comprises:
- a liftable cope fitted to a vertical casting machine;
- a fixed drag; and
- slidable molds disposed in combination with the cope and being capable of horizontally sliding in a state that the cope is released from the drag.

A yet still further object of this invention is to provide a production apparatus of a body frame, wherein a slidable mold has an undercut at a runner-defining part located over a sprue outside a cavity.

A yet still further object of this invention is to provide a production apparatus of a body frame, which comprises:

a cavity corresponding to a body frame for a motor bicycle, which comprises a head tube, a main frame and down tubes, is hollow and has an integral structure, and defined in a mold in such a manner that the portions corresponding to the down tubes become upward and the cavity becomes gradually higher from the portion corresponding to the front of the body frame toward the portion corresponding to the rear; and a plurality of sprues communicating with the upper rear portion of the cavity via the lower front portion thereof, and connected to a teeming device for charging a molten metal into the cavity by a low-pressure casting method.

A yet still further object of this invention is to provide a production apparatus of a body frame, which comprises:
- a main sprue; and
- a plurality of auxiliary sprues,
- each of said sprues being caused to communicate with a cavity via a plurality of runners and gates, and the gate sectional areas of said sprues being defined so as to become gradually smaller from the front portion toward the rear portion of the cavity.

A yet still further object of this invention is to provide a production apparatus of a body frame, wherein the heights of sprues are defined so as to become gradually greater from the front portion toward the rear portion of the cavity.

A yet still further object of this invention is to provide a production apparatus of a body frame, wherein runners are caused to branch from plural sprues, the sprues are caused to communicate with a cavity via gates, and at least auxiliary sprues are formed so as to be located in a loop drawn by the cavity, whereby their gates are located inside the loop.

Other objects and advantages of the present invention will be readily appreciated from the preferred embodiments of this invention, which will be described subsequently in detail with reference to the accompanying drawings.

BRIEF DESCRIPTION OF THE DRAWINGS

In the accompanying drawings:

FIG. 12 is a crosswise vertical sectional view illustrating the cope in a state that the core has been incorporated in the cope;

FIG. 13 is a schematic illustration of a beam member, which is a constituent member of a body frame for a four-wheel car;

FIG. 14 is a cross-sectional view taken on line XIV—XIV in FIG. 13;

FIG. 15 is a schematic illustration of another beam member, which is a constituent member of the body frame for the four-wheel car;

FIG. 16 is a cross-sectional view taken on line XVI—XVI in FIG. 15.

DETAILED DESCRIPTION OF THE PREFERRED EMBODIMENT

Figure 1:
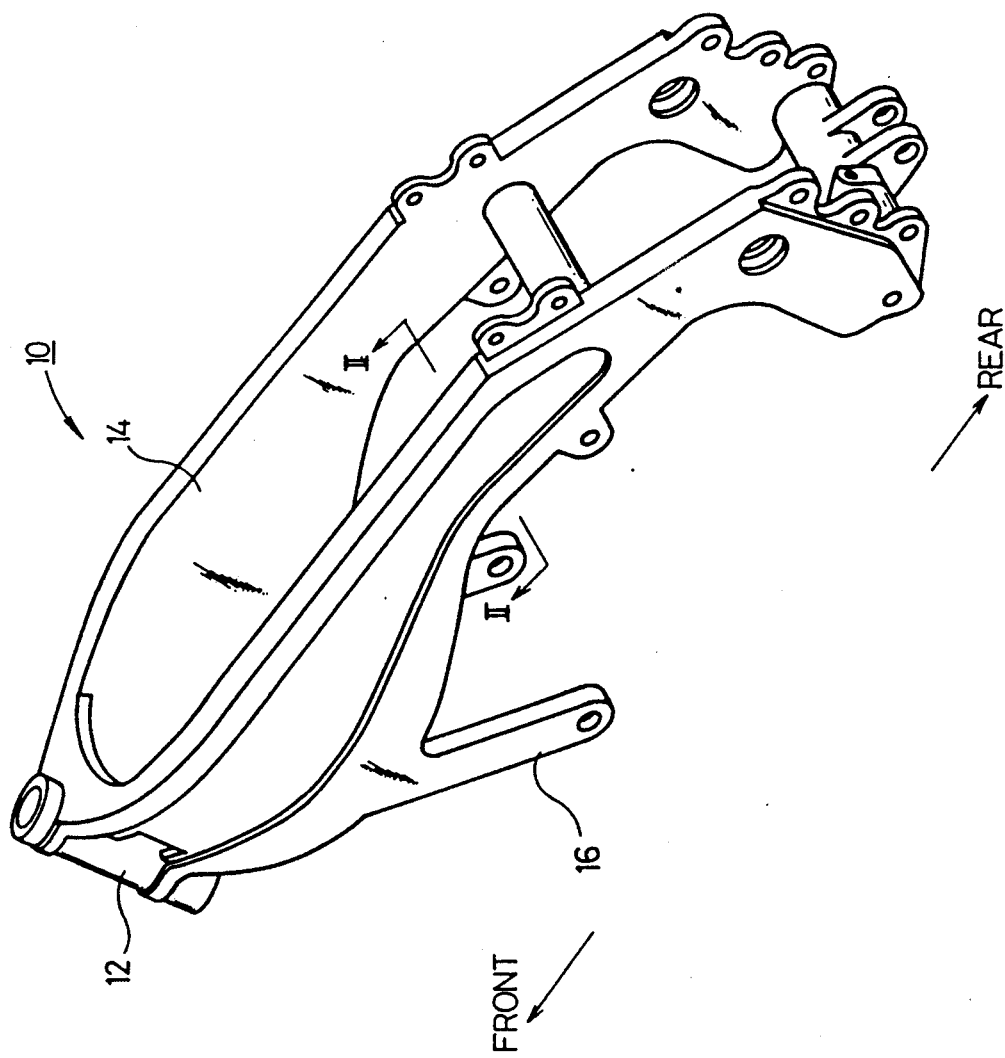
FIG. 1 is a perspective view illustrating the exterior appearance of a body frame according to this invention.

In FIG. 1, a body frame of a motor bicycle includes a frame body 10 produced in accordance with the production process of an embodiment of this invention.

Figure 2:
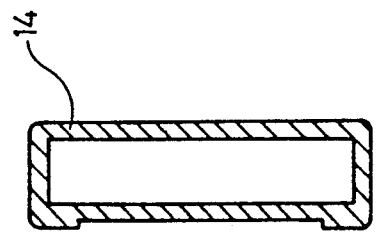
FIG. 2 is a cross-sectional view taken on line II—II of the body frame in FIG. 1.

The frame body 10 is cast by a low-pressure casting method as a seamless integral structure composed of a head tube 12 located at the front end, a main frame 14 and down tubes 16 extending downward from the front part of the main frame 14. The cross section taken on line II—II of the frame body 10 in FIG. 1 is shown in FIG. 2. As is understood from the drawing, the interior of the frame body 10 is made hollow all over.

Figure 3:
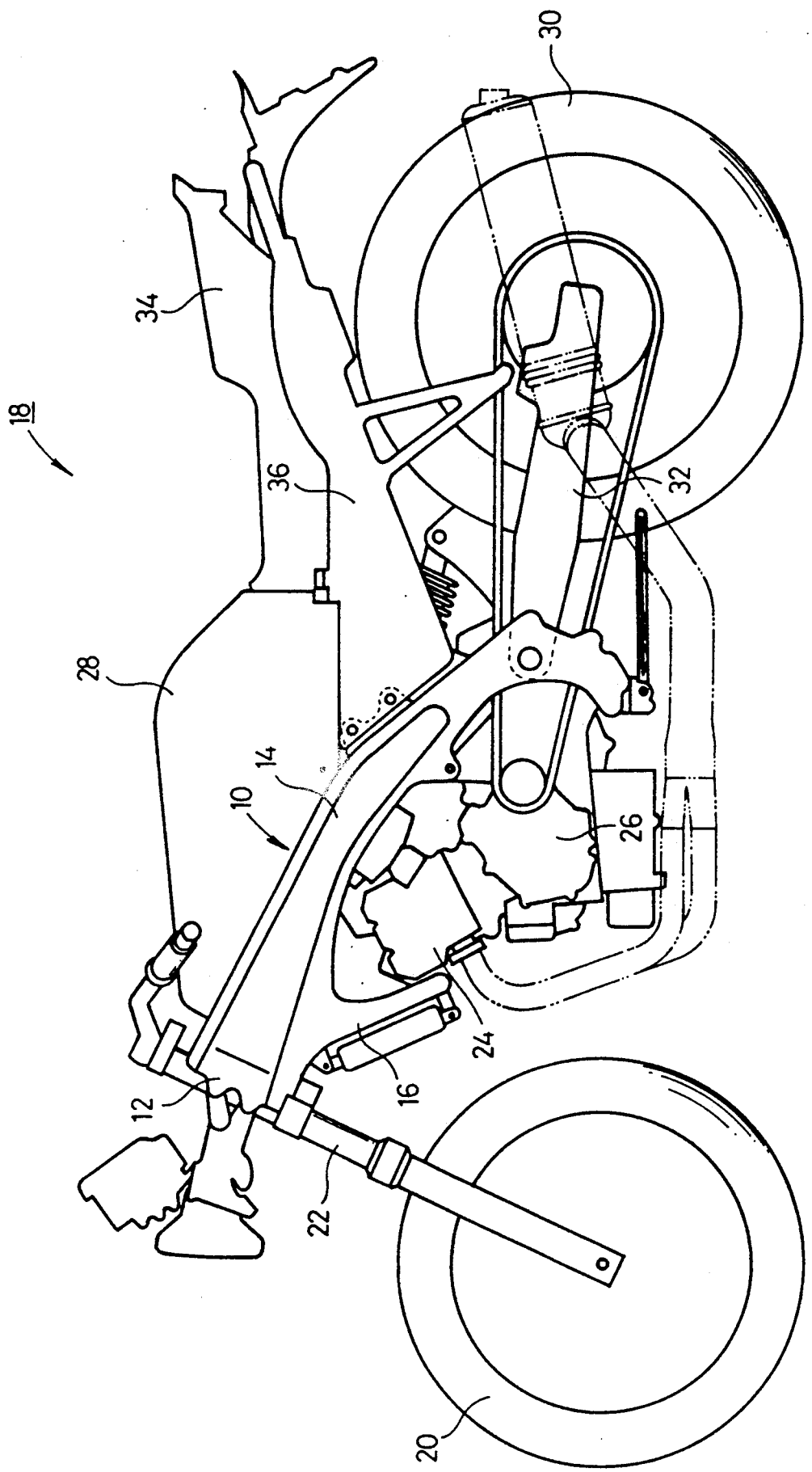
FIG. 3 is a side elevation of a motor bicycle making use of a body frame according to this invention.

FIG. 3 illustrates a motor bicycle 18 making use of such a frame body 10. Here, numeral 20 designates a front wheel. A front fork 22 bearing the front wheel 20 is inserted in and passed through the head tube 12. An engine 24 and a crank case 26 are attached to and supported by the main frame 14 and the down tubes 16. A fuel tank 28 is attached on the upper side of the main frame 14.

In addition to the frame body 10, other members constituting the body frame of the motor bicycle 18 include a swing arm 32 extending horizontally from the rear portion of the main frame 14 and supporting a rear wheel 30, and a rear frame 36 extending somewhat obliquely and upward from the rear side of the main frame 14 and adapted to attach a seat 34.

A production apparatus suitable for use in casting the frame body 10 will hereinafter be described by reference to FIG. 4.

In the drawing, numeral 40 indicates a production apparatus, namely, a casting machine. This casting machine 40 is a so-called vertical casting machine and comprises a furnace 42 for a molten metal, in which the molten metal is stored under heating (hereinafter merely called "furnace"), a working bench 44, a first truck 46, which travels on the working bench 44 so as to perform automatically the work of incorporating a core in a mold, a second truck 48 used for ejecting a resulting cast article, and a casting mold 50. Of these, the casting mold 50 is illustrated in FIGS. 7 through 12.

A rack 52 is provided on the working bench 44. The first truck 46 and second truck 48 travel along the rack 52. The first truck 46 comprises a body 54 and a mount 56 on which a core (will be described subsequently) is placed at a predetermined position through locating lugs 55, and is constructed self-movably by causing pinions 58 interlocking with the rack 52 to rotate by means of motor-driving. The body 54 is connected to the mount 56 via a pantograph 60. The mount 56 is constructed liftably by making use of a cylinder 62 as a driving source.

The second truck 48 is also constructed similarly to the first truck 46. Therefore, constituent elements performing the same functions as those in the first truck 46 are given like reference characters, and their detailed description on constitution is omitted.

In the center of the working bench 44, four stanchions 64a through 64d are provided upright. A fixed plate 66 is supported on the upper ends of the stanchions 64a through 64d. A hydraulic cylinder 68 is provided on the fixed plate 66, and a movable platen 70 for holding a cope, which will be described subsequently, of the casting mold 50 is connected to the tip of a piston rod 68a of the hydraulic cylinder 68. To the movable platen 70 are connected guide posts 72a through 72d which are inserted in and passed through the fixed plate 66. The given number of ejector pins 76 for removing a resulting cast article are fixed to the lower surface of the fixed plate 66. These ejector pins 76 are inserted in the cope.

A casting mold 50 will hereinafter be described.

Figure 7:
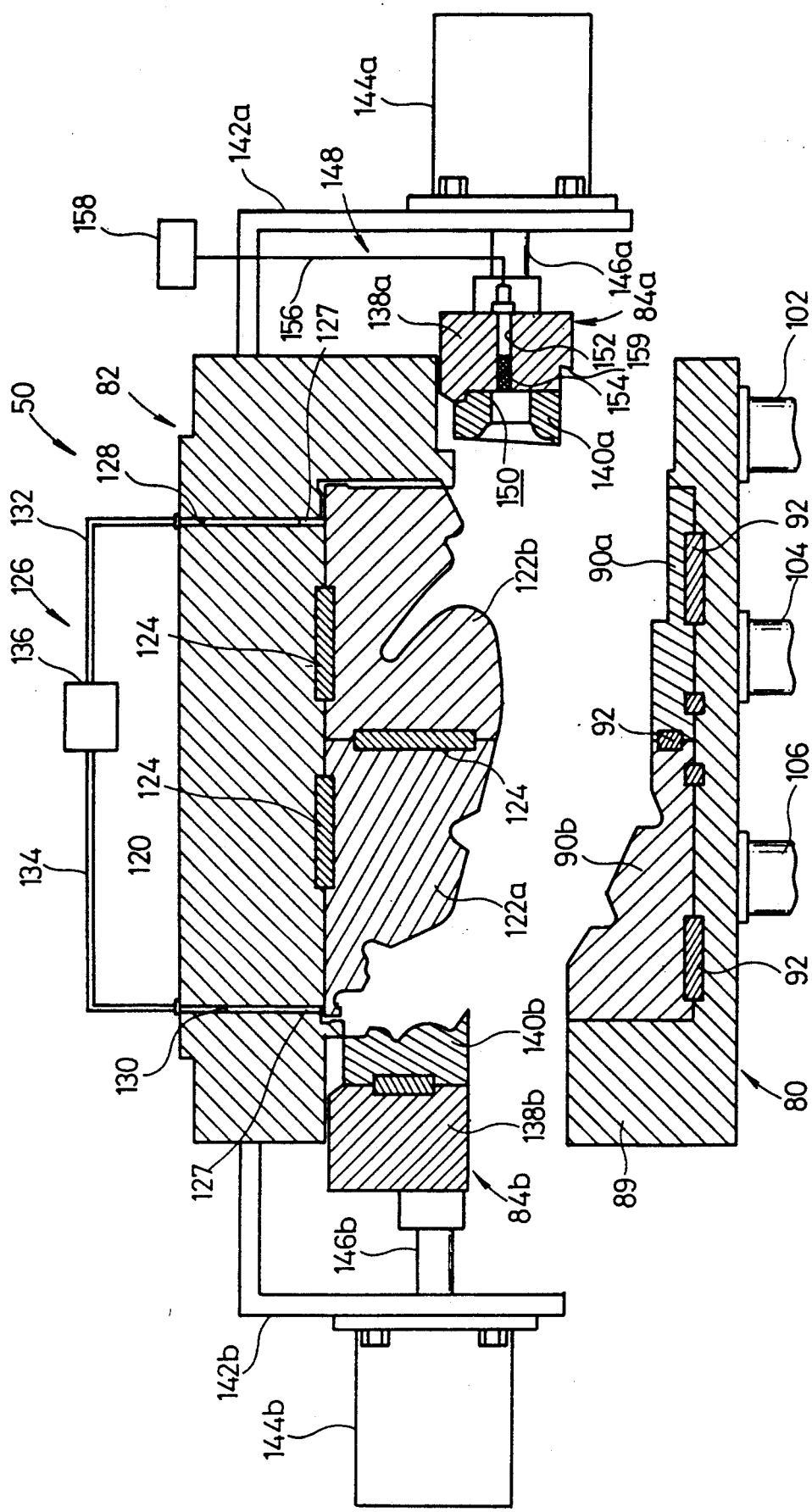
FIG. 7 is a cross-sectional view illustrating a casting mold in an opening state, which is a constituent member of the casting machine depicted in FIG. 4.
Figure 8:
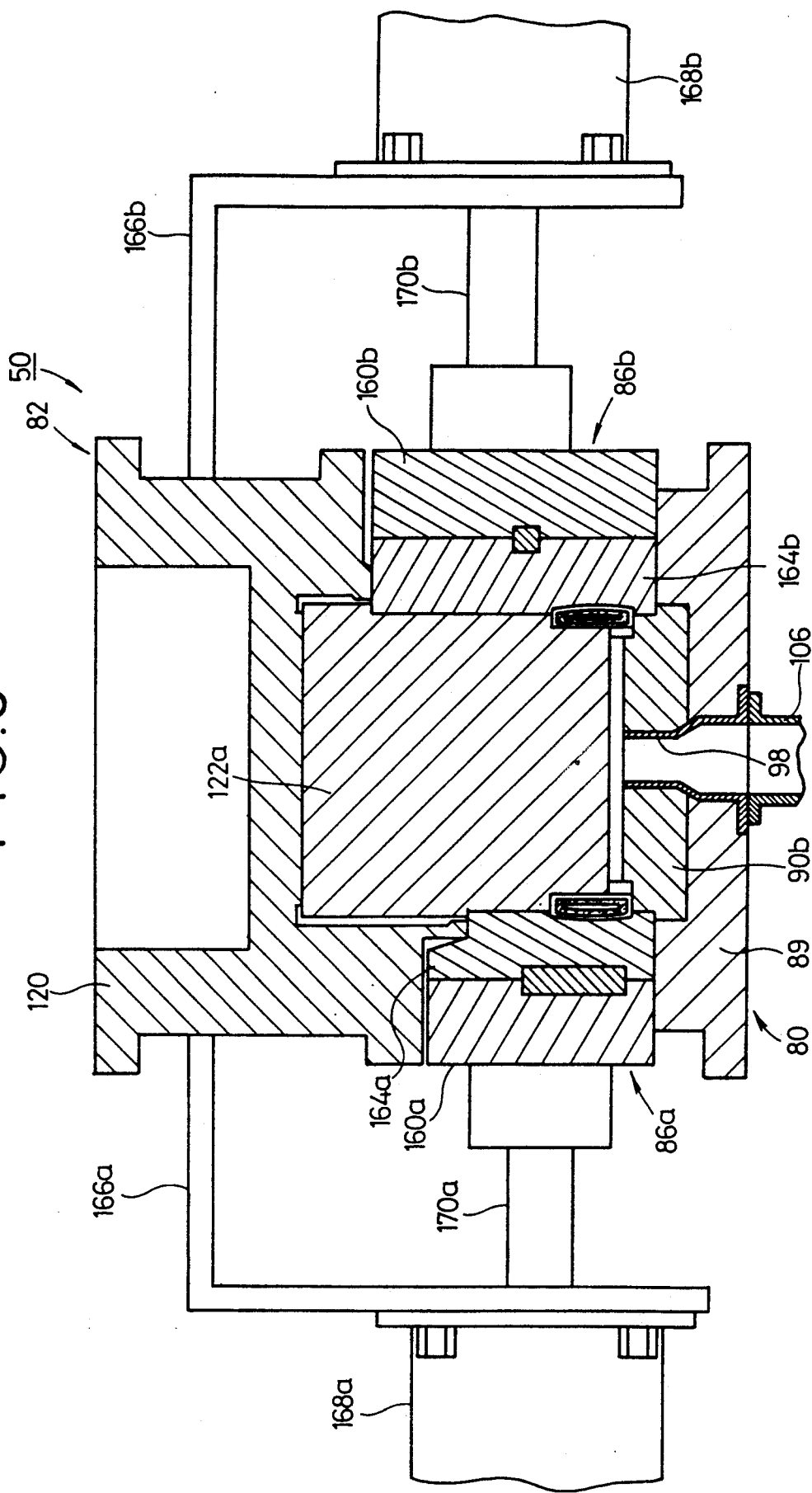
FIG. 8 is a crosswise vertical sectional view of the casting mold.

FIG. 7 is a vertical cross-sectional view taken along the longitudinal direction of the casting mold 50. The casting mold 50 comprises essentially a drag 80, which is a fixed mold, a cope 82 fixed to the movable platen 70 described above, slidable molds 84a, 84b provided in combination respectively on the front and rear sides of the cope 82, and slidable molds 86a, 86b provided in combination respectively on the left and right sides of the cope 82 as illustrated in FIG. 8. The interior surfaces of the drag 80, cope 82, slidable molds 84a, 84b and slidable molds 86a, 86b are formed respectively in shapes corresponding to the contour of the frame body 10. A cavity 88 is defined by a core described below and these molds (FIG. 9).

Referring now to the drag 80, it is equipped with a drag body 89 and inserts 90a, 90b having molding surfaces formed after the shape of the frame body 10. These inserts 90a, 90b are exchangeably attached to the drag body 89 through a required number of locating blocks 92 provided on the drag body 89.

Figure 9:
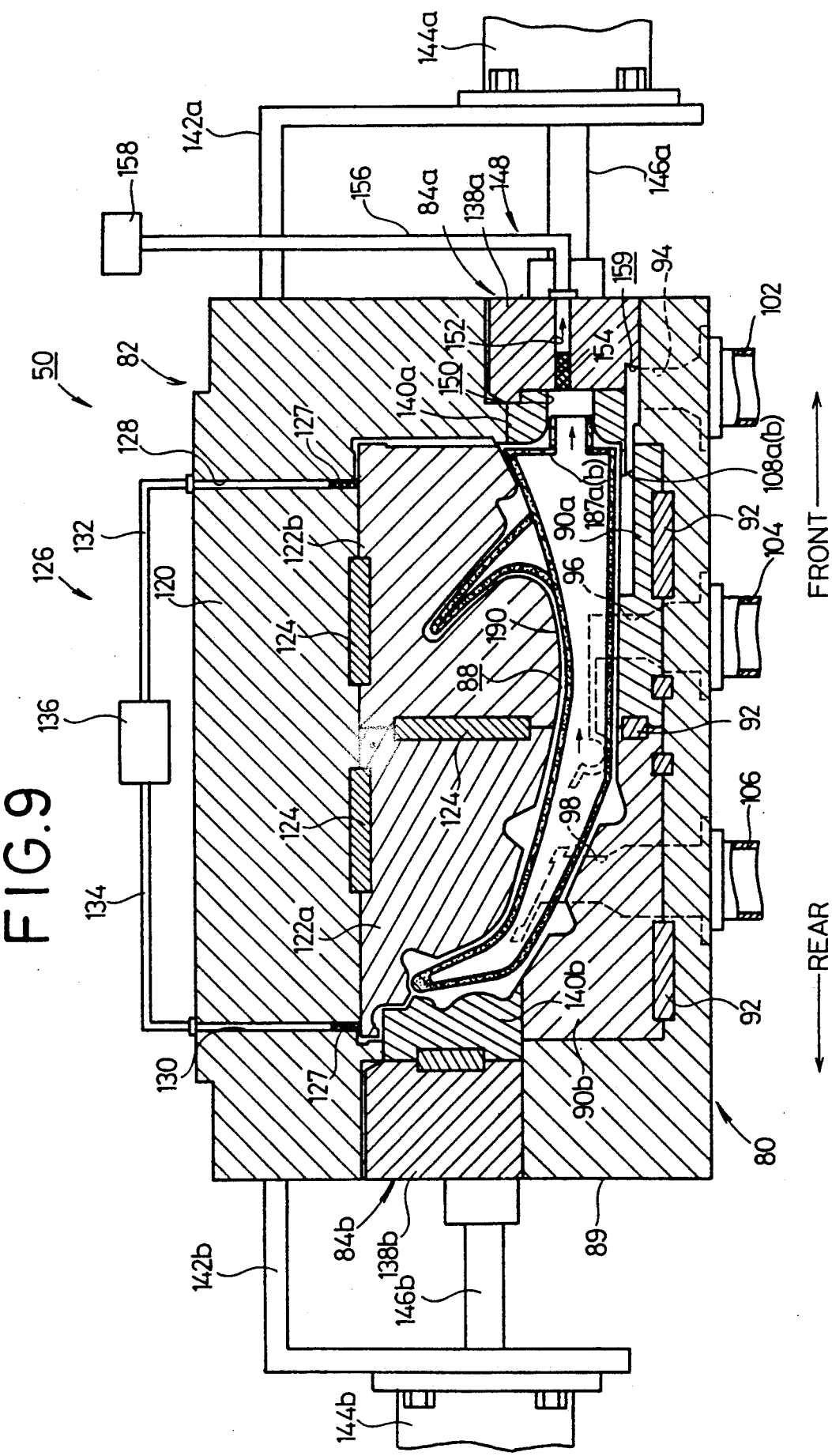
FIG. 9 is a vertical sectional view of the casting mold.
Figure 10:
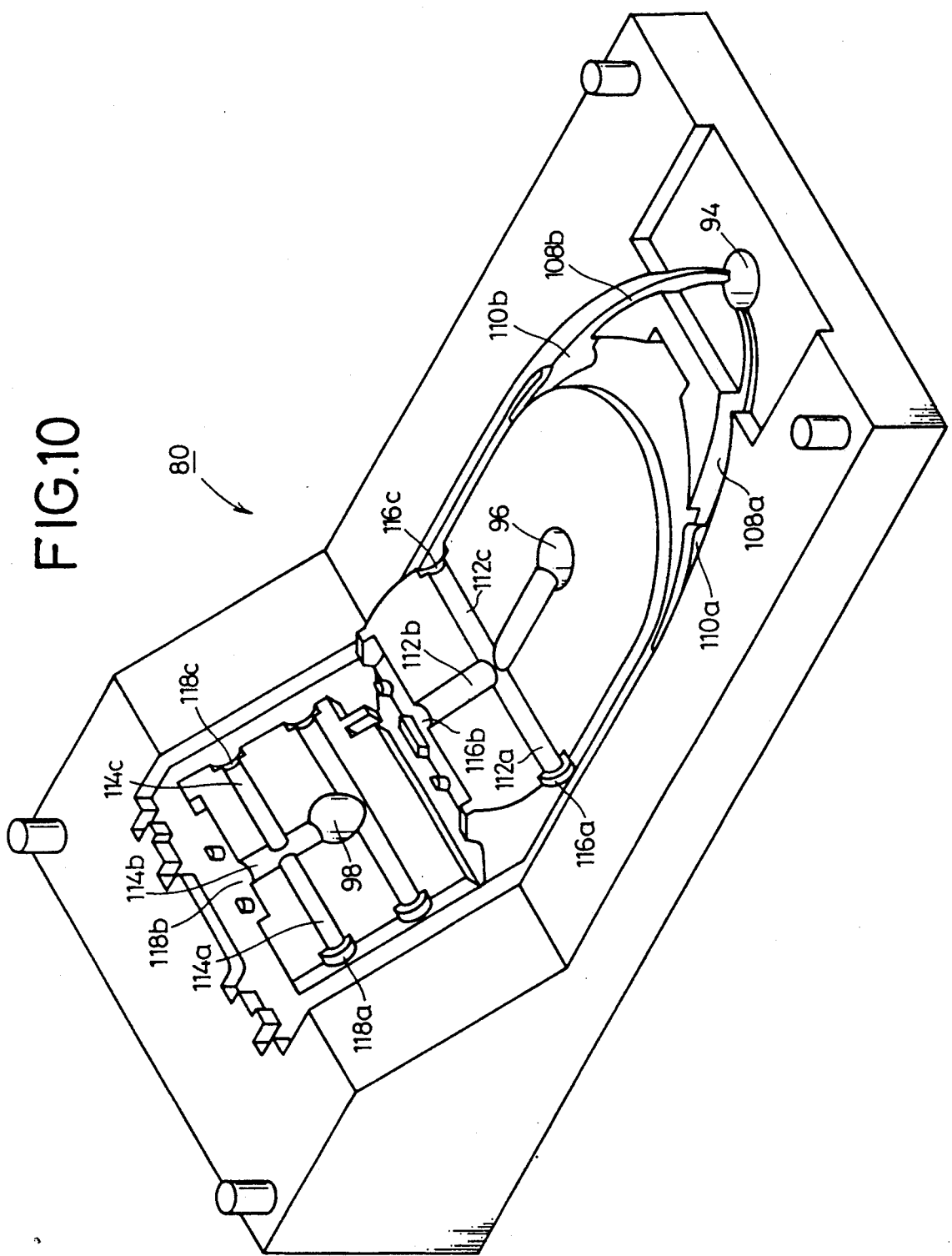
FIG. 10 is a perspective view illustrating an arrangement of gates and runners in a drag, which is a constituent member of the casting mold.

FIGS. 9 and 10 illustrate a sprue device in the drag 80. Namely, a sprue provided under the drag 80 comprises a main sprue part 94 provided nearest an end of the drag 80 and two auxiliary sprue parts 96, 98. The main sprue part 94 connects to a stoke 102, the end of which is immersed in a molten metal stored in the furnace 42. Similarly, the auxiliary sprue parts 96, 98 communicate with the interior of the furnace 42 via auxiliary stokes 104, 106.

The teeming of a molten metal is not conducted by a system wherein the molten metal is directly poured in a cavity, but is performed by the following runner-gate system in order to improve the run ability in such a manner that the molten metal can be run in details because of the complex contour of the frame body 10.

Namely, the main sprue part 94 communicates with the side of the cavity 88 via main runners 108a, 108b and main gates 110a, 110b, while the auxiliary sprue parts 96, 98 communicate with the side of the cavity 88 via subrunners 112a through 112c, 114a through 114c and subgates 116a through 116c, 118a through 118c respectively.

The cope 82 will now be described. In FIG. 9, the cope 82 is equipped with a cope body 120 and inserts 122a, 122b with molding surfaces formed therein. Similarly to the drag 80 described above, these inserts 122a, 122b are exchangeably attached to the cope body 120 through locating blocks 124. To the cope 82 are connected a first vacuum circuit communicating with the cavity 88. Namely, air intake ducts 128, 130 communicating with the cavity 88 are defined in parting lines between slidable molds 84a, 84b, which will be described subsequently, and the cope 82 via respective air vents 127. These air intake ducts 128, 130 are connected to a first vacuum pump 136 via lines 132 and 134 respectively.

A total of four slidable molds 84a, 84b and 86a, 86b are provided respectively on the front and rear sides as well as left and right sides of such a cope body 120. The slidable molds 84a, 84b provided respectively on the front and rear sides are illustrated in FIG. 7, while the slidable molds 86a, 86b provided respectively on the left and right sides are illustrated in FIG. 8.

In FIG. 7, the slidable molds 84a, 84b comprises slidable mold bodies 138a, 138b and inserts 140a, 140b respectively, and are connected respectively to piston rods 146a, 146b of the sliding cylinders 144a, 144b which are attached to the cope body 120 via L type stays 142a, 142b respectively. On one hand, a second vacuum circuit 148 is connected to the slidable mold 84a. Namely, in an insert 140a is defined an opening 150, in which a hollow projection (will be described subsequently) situated at the tip of the core is fitted from the side of the cavity 88. The opening 150 communicates with an air intake duct 152 via an air vent 154. The air intake duct 152 is connected to a line 156. A second vacuum pump 158 is connected to the downstream side of the line 156.

A deep undercut 159 is formed within the bottom of the slidable mold body 138a in order to define the main liners, 108a, 108b situated on the outer side of the cavity 88.

On the other hand, in FIG. 8, the slidable molds 86a, 86b arranged respectively on the left and right sides of the cope 82 are also constructed similarly to the slidable molds 84a, 84b, comprises slidable mold bodies 160a, 160b and inserts 144a, 140b respectively, and are connected respectively to piston rods 170a, 170b of the sliding cylinders 168a, 168b which are attached to the cope body 120 via L type stays 168a, 168b respectively.

The casting machine used in the production of the body frame according to this invention is basically constructed as described above. Making use of the casting machine, the process for the production of the frame body 10 illustrated in FIG. 1 will hereinafter be described in due order at every process.

Figure 5:
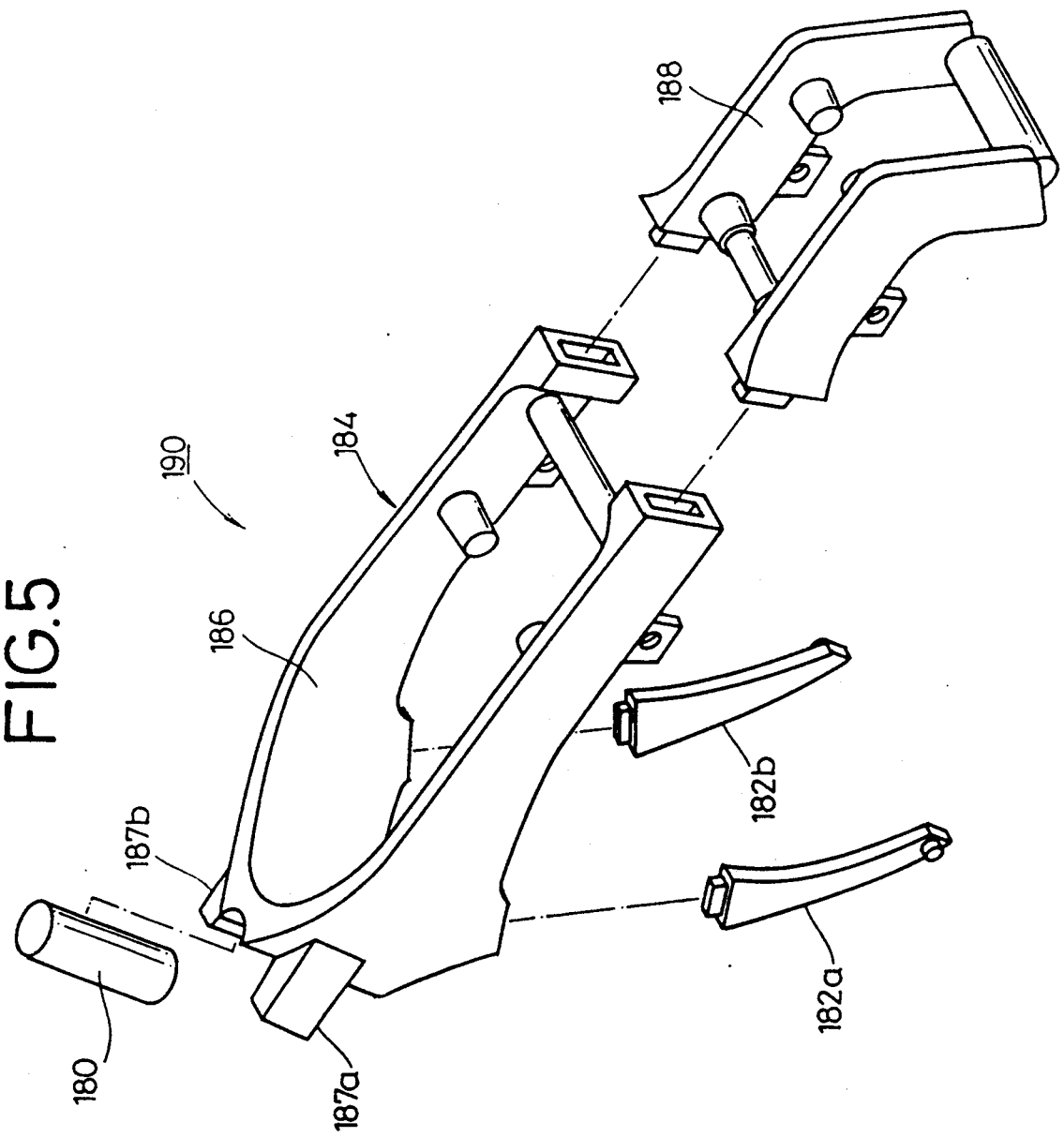
FIG. 5 is a perspective view illustrating individual cores suitable for use in producing the body frame.

Referring first of all to FIG. 5, there is illustrated a core. Upon the production of the frame body 10, in order to make the shapes of the constituent parts of the frame body 10, i.e., a head tube 12, main frame 14 and down tubes 16 desired forms, namely, their sections are hollow and walls are thin, their corresponding divided cores are formed in advance after the individual parts. This is nothing more than consideration of the convenience of forming a core.

Figure 6:
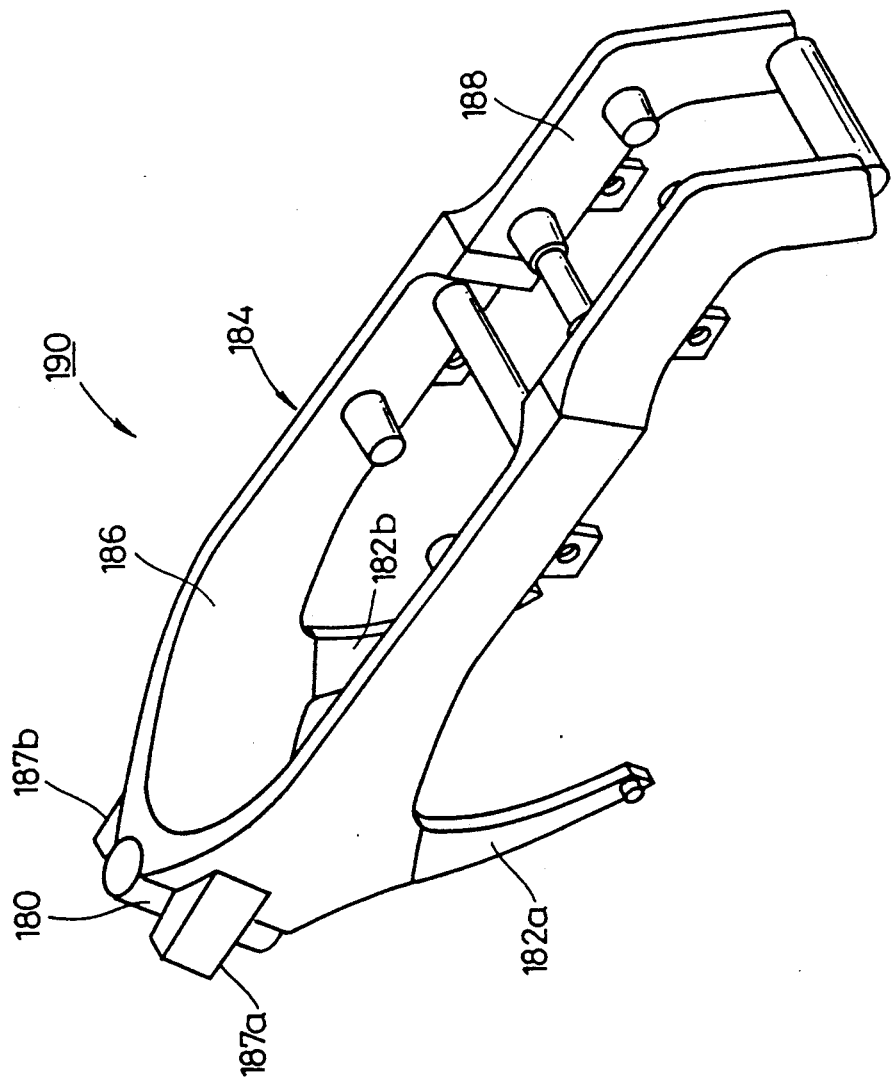
FIG. 6 is a perspective view illustrating a state that the individual cores are integrally assembled.

As is understood from the mutual comparison of FIG. 1 with FIG. 5, their corresponding cores are prepared after the shapes of the parts of the frame body 10. These divided cores include a head tube-forming core 180, down tube-forming cores 182a, 182b and a main frame-forming core 184, which serve to shape respectively a head tube 12, down tubes 16 and a main frame 14 and to make their interiors hollow. Of these, the main frame-forming core 184 comprises a first divided core 186 corresponding to the front portion of the frame body 10 and a second divided core 188 corresponding to the rear portion thereof. Projections 187a, 187b are formed at the tip part of the first divided core 186. Such various divided cores are separately obtained by using sand as a raw material and binding it with a resin so as to be formed into a desired shape. In particular, their interiors are made hollow to cause them to communicate with one another. As illustrated in FIG. 6, these cores are provided for a casting process as an integral core assembly 190. As will be described subsequently, vacuum extraction is conducted from the projections 187a, 187b of the first divided core in the main frame-forming core 184.

Figure 4:
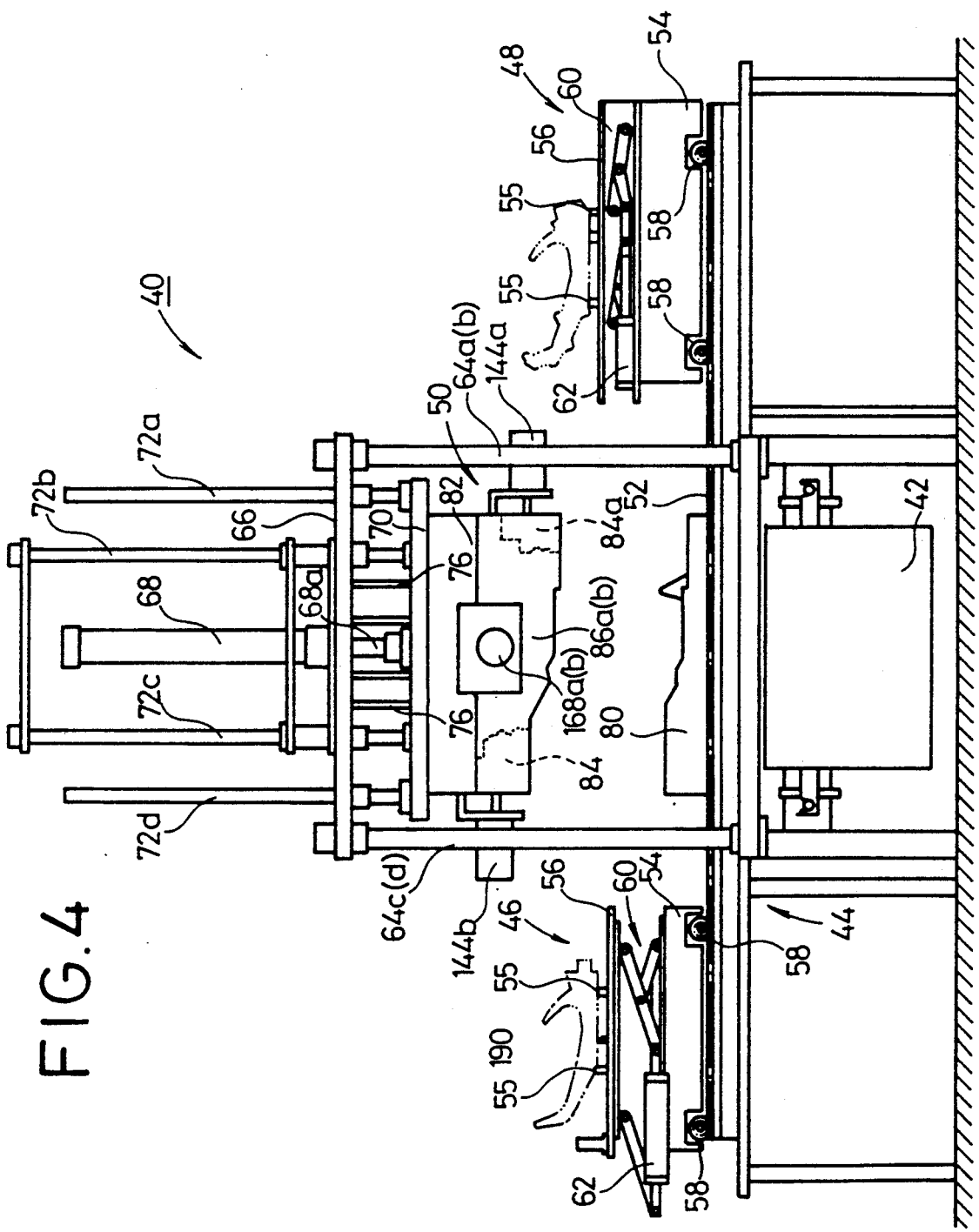
FIG. 4 is a side elevation of a casting machine suitable for use in producing the body frame.

Referring now to FIG. 4, the core assembly 190 is positioned on the locating lugs 55 provided on the core mount 56 of the first truck 46. Thereafter, the first truck 46 is caused to travel automatically by the rotation of the pinion 58 interlocking with the rack 52 and then to stop at the predetermined position under the cope 82.

Figure 11:
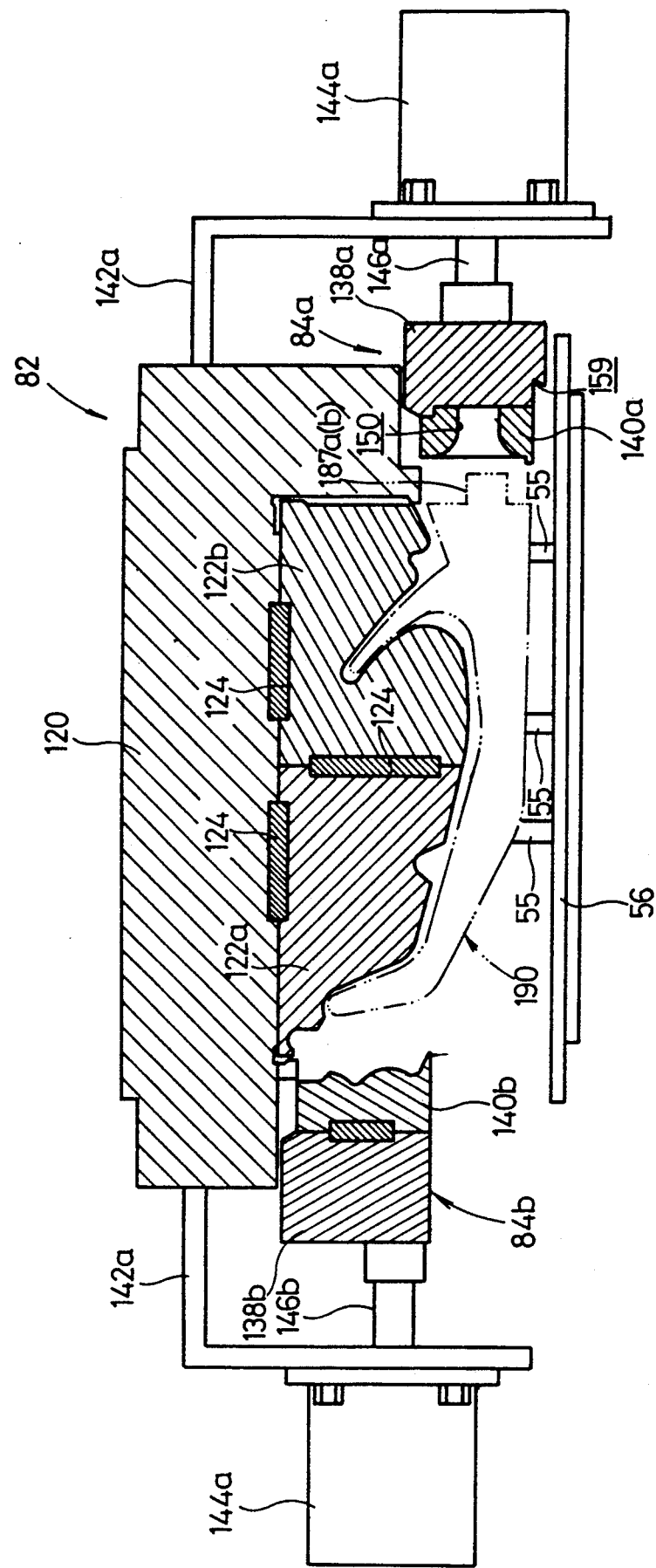
FIG. 11 is a lengthwise vertical sectional view illustrating a cope in a state that the core has been incorporated in the cope.

The hydraulic cylinder 68 is then actuated, so that the cope 82 comes down. The cope 82 is stopped once at the position surrounding the core assembly 190. While the cope 82 remains at this position, the mount 56, on which the core assembly 190 is placed, is lifted up in the first truck 46. Namely, the pantograph 60 is caused to elongate upward under driving action of the cylinder 62, so that the mount 56 comes near to the cope 82. The slidable molds 84a, 84b and slidable molds 86a, 86b provided in combination on the cope 82 are then closed. Namely, as illustrated in FIGS. 11 and 12, the sliding cylinders 144a, 114b and sliding cylinders 168a, 168b are actuated so as to cause the respective piston rods 146a, 146b, 170a and 170b to elongate, so that the slidable molds 84a, 84b and slidable molds 86a, 86b progress. In particular, the projections 187a, 187b of the core assemble 190 are fitted in the opening 150 in the slidable mold 84a and the rear end of the core assembly 190 is held between the slidable mold 84b and the insert 122a of the cope 82, whereby the core assembly 190 is accurately fixed and positioned in the cope. If sand in the core assembly 190 drops upon its fixing, the drop of the sand on the molding surface of the drag 80 is avoided because the sand drops on the mount 56. In addition, even if the sand drops on the drag 80, the sand can be removed with ease by blowing air because the core assemble 190 is fixed to the cope 82.

Thereafter, the first track 46 is moved at the time when the fixing of the core assembly 190 has been completed to separate from the drag 80. The cope 82 is caused to descend again to fit to the drag 80, thereby resulting in a clamping state.

A casting process, wherein a molten metal is poured in the cavity 88, is then started. Casting conditions at this time will be described below.

| Casting conditions | |
|---|---|
| Material | Aluminum alloy |
| Temperature of molten metal | 720° C. |
| Temperature of mold | 360° C. |
| Applied pressure | 0.5 kg/cm$^7$ |
| Degree of vacuum on core side | 50 mmHg |
| Degree of vacuum on cavity side | 60 mmHg |

The term "degree of vacuum on core side" as used herein means conditions that the hollow portion of the core assembly 190 is controlled to a state of a negative pressure in order to suck a combustion gas generating from a resin in the course of the casting process, while the term "degree of vacuum on cavity side" as used herein means conditions that the cavity 88 is controlled to a state of a negative pressure in order to cause a molten metal to reach thin-wall parts to a sufficient extent when it begins to be charged in the cavity 88.

First of all, a negative pressure state is caused to occur in the interior of the core assembly 190. In FIG. 9, the second vacuum pump 158 in the second vacuum circuit is actuated in this case, so that air in the hollow portion of the core assembly 190 is sucked through the line 156, air intake duct 152 and air vent 154. The pressure in the hollow portion of the core assembly 190 is hence reduced. Thereafter, the degree of vacuum in the core assembly 190 is kept to 50 mmHg or so under the sucking action of the second vacuum pump 158.

A process, wherein a molten metal is charged in the cavity 88 in the casting mold 50 under pressure, is then started. However, as is understood from referring to FIG. 1, the frame body 10 is in the form of a loop as the whole and is of a considerably complex shape including projection parts such as the down tubes 16. It is therefore necessary to adopt a countermeasure against the deterioration of a run when such a product is integrally cast as a hollow and thin-wall structure.

Accordingly, in the embodiment of this invention, the following means are adopted with respect to the direction of a cavity, the number of sprues, gate area, the height of sprues, the arrangement position of a runner gate extending from each of the sprues to the cavity, etc. when casting a frame body 10 as a hollow and thin-wall integral structure.

(1) Direction of cavity:

As is understood from the mutual comparison of FIG. 1 with FIGS. 9 and 10, a cavity 88 is defined within a casting mold 50 in such a manner that it becomes a upside-down pose compared with the frame body 10 in a fitting position relative to a motor bicycle. In this case, the frame body 10 has a shape that it extends almost horizontally from the front side to the rear side and bends down at the rear side. Therefore, in contrast with this, the cavity 88 extends in such a manner that it is almost horizontal from the front side to the center and becomes higher than the front side at the portion extending from the center to the end of the rear side. A main sprue part 94 is provided at the end of the lower-most front side to charge a molten metal therefrom in the cavity on the front side where a volume of the molten metal is most required. The molten metal is secondarily charged from auxiliary sprue parts 96, 98. As a result, the head in the course of the run in the cavity 88 becomes smaller, so that the molten metal tends to reach. There is hence an effect that the run failure caused by lowering in the temperature of the molten metal in the course of the charging can be avoided.

(2) The number of sprues and gate area:

As has been described above, the main sprue part 94 and auxiliary sprue parts 96, 98 are provided as sprues to form a multipoint sprue because the teeming from the main sprue part 94 alone is actually difficult to cause the molten metal to reach all over the cavity 88. Therefore, at least three sprues are provide. Namely, the teeming has been conducted by charging a molten metal from the main sprue part 94 in the front side where a volume of the molten metal is most required in the cavity 88 and pouring it in the center and the rear side from the auxiliary sprue parts 96 and 98 respectively. At this time, if the molten metal poured from the auxiliary sprue parts 96, 98 should be run to the front side of the cavity 88 to interfere with the molten metal charged from the main sprue parts 94, or the molten metal poured from the auxiliary sprue parts 96, 98 should first be run to the rear side of the cavity 88 and after that, the molten metal from the main sprue part 94 should be charged in the cavity 88 on the front side, directional solidification of the molten metal will be inhibited after all. Therefore, the gross sectional area of main gates 110a, 110b extending from the main sprue part 94 to the cavity 88 has been made greatest and the gross sectional areas of subgates 116a through 116c and 118a through 118c have been made smaller in order of the auxiliary sprue parts 96 and 98 from the front side toward the rear side. As a result, there is avoided an inconvenience such that the molten metal, which has been first charged in the cavity on the rear side from the auxiliary sprue parts 96, 98 and lowered in temperature, runs to the front side, thereby distrubing the balance of solidification.

(3) Height of sprues:

In addition to the sectional area of the gate, the height of the sprue is made greater as it comes nearer to the rear side rather than the front side. Namely, the height of the sprue is made greater in order of the main sprue part 94, the auxiliary sprue part 96 and the auxiliary sprue part 98. As a result, the molten metal is charged in the cavity from the front side toward the rear side in cooperation with the similar changes in sectional area on the gates.

(4) Gate position:

In addition, the positional relation between the main sprue part 94 and auxiliary sprue parts 96, 98 and the gates thereof, which have been all described above, is illustrated in FIG. 10. Namely, the main sprue part 94 faces on the bottom end of the cavity 88 via the main runners 108a, 108b and the main gates 110a, 110b, while the auxiliary sprue parts 96, 98 face on the inside of a loop drawn by the cavity 88 via the subrunners 112a through 112c and 114a through 114c and the subgates 116a through 116c and 118a through 118b respectively. The main sprue part 94 and the auxiliary sprue parts 96, 98 are situated on the center line of the loop. As described above, the subrunners 112a through 112c and 114a through 114b of the auxiliary sprue parts 96 and 98 are caused to branch, so that the subgates 116a through 116c and 118a through 118c are caused to locate within the loop. As a result, the gate-cut treatment of a resulting cast article becomes easy. In addition, the appearance of the cast article is not impaired because the cut mark exists in its interior.

An inert gas is then fed in the interior of a furnace 42 under a predetermined pressure, so that the surface of the molten metal, which has been kept under heating in the furnace 42, is pressurized with the inert gas. The molten metal is raised through a main stroke 102 and auxiliary stokes 104, 106 to fill the cavity 88 through the main sprue part 94 and auxiliary sprue parts 96, 98, which have been provided in the drag 80.

In this case, referring to FIG. 10, a required volume of the molten metal is at least poured from the main sprue part 94 facing on the portion where a greater volume of the molten metal is required in the cavity 88, namely, the portion corresponding to the front side of the frame body 10, via the main runners 108a, 108b and the main gates 110a, 110b. On the other hand, for the portion where the molten metal is relatively difficult to run, namely, the portion corresponding to the rear side of the frame body 10, the molten metal is fed from the auxiliary sprue parts 96, 98 via the subrunners 112a through 112c and 114a through 114c and the subgates 116a through 116c and 118a through 118c respectively.

At this time, a gas generating due to the combustion of a resin upon the contact of the molten metal with the core assembly 190 is forcedly eliminated from the hollow portion inside the core assembly 190. Namely, since the hollow portion of the core assembly 190 is in a negative-pressure state, the gas is drawn off from the projections 187a, 187b situated at the end of the core assembly 190 to its exterior via the air vent 154 and further sucked out of the opening 150 toward the vacuum pump 158 as illustrated in FIG. 9.

In the above-described manner, since the gas does not remain in the molten metal when the molten metal is filled the cavity 88, it is possible to obviate casting defects caused by the remaining gas.

By the way, the cavity 88 defined between the core assembly 190 and the molding surfaces of the drag 80 and the cope 82 is long in one direction and considerably complex in shape. In addition, the cavity 88 includes a considerably narrow space when a frame body 10 as a product is cast into a thin-wall structure. There is hence an apprehension that the run will be insufficient.

Accordingly, the pressure on the cavity side is reduced when the molten metal has begun to be charged. Namely, the first vacuum pump 136 in the first vacuum circuit 126 is actuated. As a result, the air inside the cavity 88 is drawn off through the parting lines between the cope 82 and the slidable molds 84a, 84b via the air vents 127, intake ducts 128, 130 and lines 132, 134. In this case, the degree of vacuum in the cavity 88 is kept about 60 mmHg, namely, higher than that of the hollow portion in the core assembly 190 as described above, under the sucking action of the first vacuum pump 136. This is intended to prevent the molten metal from being sucked into the side of the core assembly 190.

It is possible to improve the run ability by making the cavity 88 a negative-pressure state at a period when the molten metal begins to be poured as described above, so that the molten metal can reach all portions of the cavity 88.

The molten metal filled in the cavity 88 as described above is kept under pressure for a predetermined period of time to solidify the molten metal.

Thereafter, the cope 82 is lifted up to open the casting mold and the slidable molds 84a, 84b and 86a, 86b, which have been provided in combination at the cope 82, are released and displaced to eject a resulting cast article. In this case, the cope 82 is lift up before the second truck 48 is caused to automatically travel on the working bench 44 to the stop position under the cope 82 as illustrated in FIG. 4. Thereafter, the sliding cylinders 148a, 148b and the sliding cylinder 168a, 168b are actuated to back the slidable molds 84a, 84b and the slidable molds 86a, 86b respectively. When the cope 82 is left up further, the cast article is pressed out by ejector pins 76. As a result, the cast article is ejected out on the second truck 48. At this time, the cylinder 62 in the second truck 48 is actuated to elongate the pantograph 60 upward, so that the mount 56 is lifted up to receive the cast article.

Here, in the release process as described above, the release of the cast article is easy. Namely, the resistance to the release usually becomes greatest near the sprues and in particular, the resistance to the release of the metal portion solidified at the main sprue part 94, which is situated on the outside relative to the cast article, becomes a problem. However, since an undercut 159 is provided at the runner-defining portion facing on the main sprue part 94 in the bottom surface of the slidable mold 84a, the solidified metal attaches to the slidable mold 84a, in a state engaging with the undercut 159. In this state, when the cope 82 is lifted up, the cast article is easily separated together with the cope 80 from the drag 82. Therefore, unnatural force does not apply to the cast article. It is hence possible to prevent the cast article from cracking and/or deforming.

Furthermore, since the slidable molds 84a, 84b and the slidable molds 86a, 86b are provided at the cope 82, they are not subject to a direct influence of heat from a heat source, i.e., the furnace 42, whereby the sliding clearance between the cope 82 and the slidable molds 84a, 84b and 86a, 86 does not become warped. It is hence possible to ensure the normal operation of these slidable molds 84a, 84b and 86a, 86. In addition, there is an advantage from the viewpoint of preventing the occurrence of flashes caused by incomplete clamping.

After the pantograph 60 is collapsed, the second truck 48 is caused to automatically travel with the cast article put on to return to the end of the work bench 44. The cast article is then subjected to a finishing process such as gate cutting, core removal and barreling, thereby completing a frame body 10.

Incidentally, the production process as described above can also be used, in addition to the production of the frame body 10, in the production of, for example, a rear frame and swing arm as illustrated in FIG. 2.

Moreover, the process can also be applied to body frames for four-wheel cars and the like in addition to the body frames for the motor bicycles. Such examples are illustrated in FIGS. 13 through 16. Namely, beam members 200, 202 constituting a body frame each having an integral structure, are hollow and can be produced by a low-pressure casting method. At this time, it is only necessary to conduct a casting operation by means of almost the same casting machine as the above-described casting machine 40 in accordance with the processes described above.

As has been described above, according to this invention, the resulting body frame is a cast article of an integral structure. Its commercial value from the viewpoint of shaping hence becomes higher. In addition, its stiffness also becomes higher because no joint is present. Furthermore, since the frame is hollow weight reduction can be achieved.

Moreover, according to this invention, any casting defects caused by the remaining gas can be obviated because the hollow core assembly is used to suck and eliminate the gas, which has been generated by coming into contact with a molten metal, from the interior of the core assembly.

In addition, by sucking from the cavity side when the molten metal has begun to be charged, it is possible to facilitate the run of the molten metal. There can hence be achieved an effect that problems on run ability when the body frame is cast as a completely integral, hollow and thin-wall structure can be solved.

Furthermore, according to this invention, since slidable molds are provided to the cope, it is possible to prevent the operation failure of the slidable molds due to the influence of heat. Besides, since the core assembly is fixed to the cope by clamping the slidable molds in a state that the core assembly is supported on the mount at the position where the cope is separated from the drag, there can be achieved effects that working such as removal of sand can be conducted with ease even if the sand drops on the drag and at the same time, the quality deterioration of the cast article caused by sand can be obviated.

In addition, since the undercut is provided at the runner-defining portion of a slidable mold, the release of the cast article can be surely conducted in one with the cope. Moreover, the cast article can be removed with ease by opening the slidable molds.

Furthermore, according to this invention, it is possible to overcome the deterioration of run ability, which is a drawback upon casting a hollow body frame having an integral structure by a low-pressure method, thereby obviating any casting defects caused by run failure. It is also easy to attain directional solidification. Accordingly, there can be achieved an effect permitting the production of a light-weight and high-quality body frames which are also excellent in apparent shapability.

What is claimed is:

1. A process for the production of a body frame, comprising the steps of:
    arranging a mold in such a manner that a predetermined portion of a cavity, which corresponds to a head tube in the mold, is located at the lower part, a prescribed portion of the cavity, which corresponds to a rear frame, is located at the upper part, and the portion corresponding to down tubes is directed upward;
    pouring a molten metal into the mold through a sprue communicating with the predetermined cavity portion corresponding to the head tube by a low-pressure casting method in such manner that the molten metal is directed to the cavity portions corresponding to the rear frame and down tubes from the head tube portion; and
    solidifying the molten metal so as to form integrally a body frame for a motor bicycle, which comprises the head tube, main frame and down tubes and is hollow.

2. The process as claimed in claim 1, wherein upon pouring the molten metal into cavity portions, which correspond respectively to a rear frame and down tubes and are located at the upper part, from the cavity portion corresponding to a head tube, which is located at the lower part, via respective runners and gates from a plurality of sprues, the teeming rate of the molten metal on the head tube sides is made greater than those of the rear frame and down tube sides.

3. An apparatus for the production of a body frame, which comprises:
    a cavity corresponding to a body frame for a motor bicycle, which comprises a head tube, a main frame and down tubes, is hollow and has an integral structure, and defined in a mold in such a manner that the portions corresponding to the down tubes become upward and the cavity becomes gradually higher from the portion corresponding to the front of the body frame toward the portion corresponding to the rear; and
    a plurality of sprues communicating with the upper rear portion of the cavity via the lower front portion thereof, and connected to a teeming device for charging a molten metal into the cavity by a low-pressure casting method.

4. The apparatus as claimed in claim 3, wherein the sprue comprises:
    a main sprue; and
    a plurality of auxiliary sprues,
    each of said sprues being caused to communicate with a cavity via a plurality of runners and gates, and the gate sectional areas of said sprues being defined so as to become gradually smaller from the front portion toward the rear portion of the cavity.

5. The apparatus as claimed in claim 4, wherein the heights of the sprues are defined so as to become gradually greater from the front portion toward the rear portion of the cavity.

6. The apparatus as claimed in claim 4, wherein runners are caused to branch from the plural sprues, the sprues are caused to communicate with a cavity via gates, and at least auxiliary sprues are formed so as to be located in a loop drawn by the cavity, whereby their gates are located inside the loop.

* * * * *